(12) United States Patent
Tione et al.

(10) Patent No.: US 10,464,543 B2
(45) Date of Patent: *Nov. 5, 2019

(54) ELECTRO-PNEUMATIC APPARATUS FOR CONTROLLING THE BRAKING OF A RAILWAY VEHICLE

(71) Applicant: FAIVELEY TRANSPORT ITALIA S.P.A., Piossasco (Turin) (IT)

(72) Inventors: Roberto Tione, Lauriano (IT); Roberto Correndo, Carmagnola (IT); Giuseppe Lore', Piossasco (IT); Hervé Savary, Saint Cyr sur Loire (FR)

(73) Assignee: FAIVELEY TRANSPORT ITALIA S.P.A., Piossasco (Torino) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/747,461

(22) PCT Filed: Jul. 29, 2016

(86) PCT No.: PCT/IB2016/054541
§ 371 (c)(1),
(2) Date: Jan. 25, 2018

(87) PCT Pub. No.: WO2017/021837
PCT Pub. Date: Feb. 9, 2017

(65) Prior Publication Data
US 2018/0215364 A1    Aug. 2, 2018

(30) Foreign Application Priority Data

Jul. 31, 2015    (IT) ........................ 102015000041004

(51) Int. Cl.
*B60T 13/66*     (2006.01)
*B60T 17/22*     (2006.01)
(Continued)

(52) U.S. Cl.
CPC .......... *B60T 13/665* (2013.01); *B60T 8/1893* (2013.01); *B60T 13/683* (2013.01); *B60T 15/021* (2013.01);
(Continued)

(58) Field of Classification Search
CPC ..... B60L 7/04; B60T 8/00; B60T 8/18; B60T 8/1705; B60T 8/1893; B60T 11/326;
(Continued)

(56) References Cited

U.S. PATENT DOCUMENTS 5,615,929 A * 4/1997 Broome ................... B60T 8/00
                                                            303/15
5,738,417 A * 4/1998 Wood ..................... B60T 13/665
                                                            303/15
(Continued)

FOREIGN PATENT DOCUMENTS

GB         2510551 A     8/2014
WO      2014/190003 A1  11/2014

*Primary Examiner* — Robert A. Siconolfi
*Assistant Examiner* — San M Aung
(74) *Attorney, Agent, or Firm* — Arent Fox LLP; Michael Fainberg

(57) ABSTRACT

The apparatus comprises a sensor for generating a vehicle load signal, weighting devices designed to supply a weighted pneumatic pressure as a function of the load signal, and first and second braking control apparatus, both coupled to the weighting devices and comprising respective relay valves which supply at their outlets respective braking pressures, modulated as a function of said weighted pneumatic pressure, to respective braking actuators associated with the wheels of a respective axle or of a respective bogie of the vehicle. The weighting devices comprise an electro-pneumatic drive assembly which is interposed between pneumatic pressure supply means and the drive inlet of the relay valves and an electronic weighting control unit which controls the drive assembly as a function of the load signal,
(Continued)

so as to modulate in a predetermined way the pressure at the drive inlet of the relay valves.

6 Claims, 3 Drawing Sheets

(51) Int. Cl.
*B60T 8/18* (2006.01)
*B60T 13/68* (2006.01)
*B60T 15/02* (2006.01)

(52) U.S. Cl.
CPC .......... *B60T 15/027* (2013.01); *B60T 17/228* (2013.01); *B60T 2270/40* (2013.01)

(58) Field of Classification Search
CPC .......... B60T 13/26; B60T 13/58; B60T 13/66; B60T 13/665; B60T 13/683; B60T 13/686; B60T 17/228
USPC .......... 303/15, 3, 7, 127, 128; 188/3 H, 3 R, 188/112 A, 112 R
See application file for complete search history.

(56) References Cited

U.S. PATENT DOCUMENTS

| | | | | |
|---|---|---|---|---|
| 6,095,621 | A * | 8/2000 | Wood | B60T 8/1881 303/122.15 |
| 2002/0036428 | A1* | 3/2002 | Jacob | B60T 13/263 303/9.73 |
| 2002/0163248 | A1* | 11/2002 | Wood | B60T 8/1881 303/128 |
| 2004/0119331 | A1* | 6/2004 | Long | B60T 13/665 303/3 |
| 2004/0130205 | A1* | 7/2004 | Wood | B60T 13/665 303/22.6 |
| 2015/0367826 | A1* | 12/2015 | Bildstein | B61H 5/00 303/10 |
| 2017/0096128 | A1 | 4/2017 | Correndo et al. | |

* cited by examiner

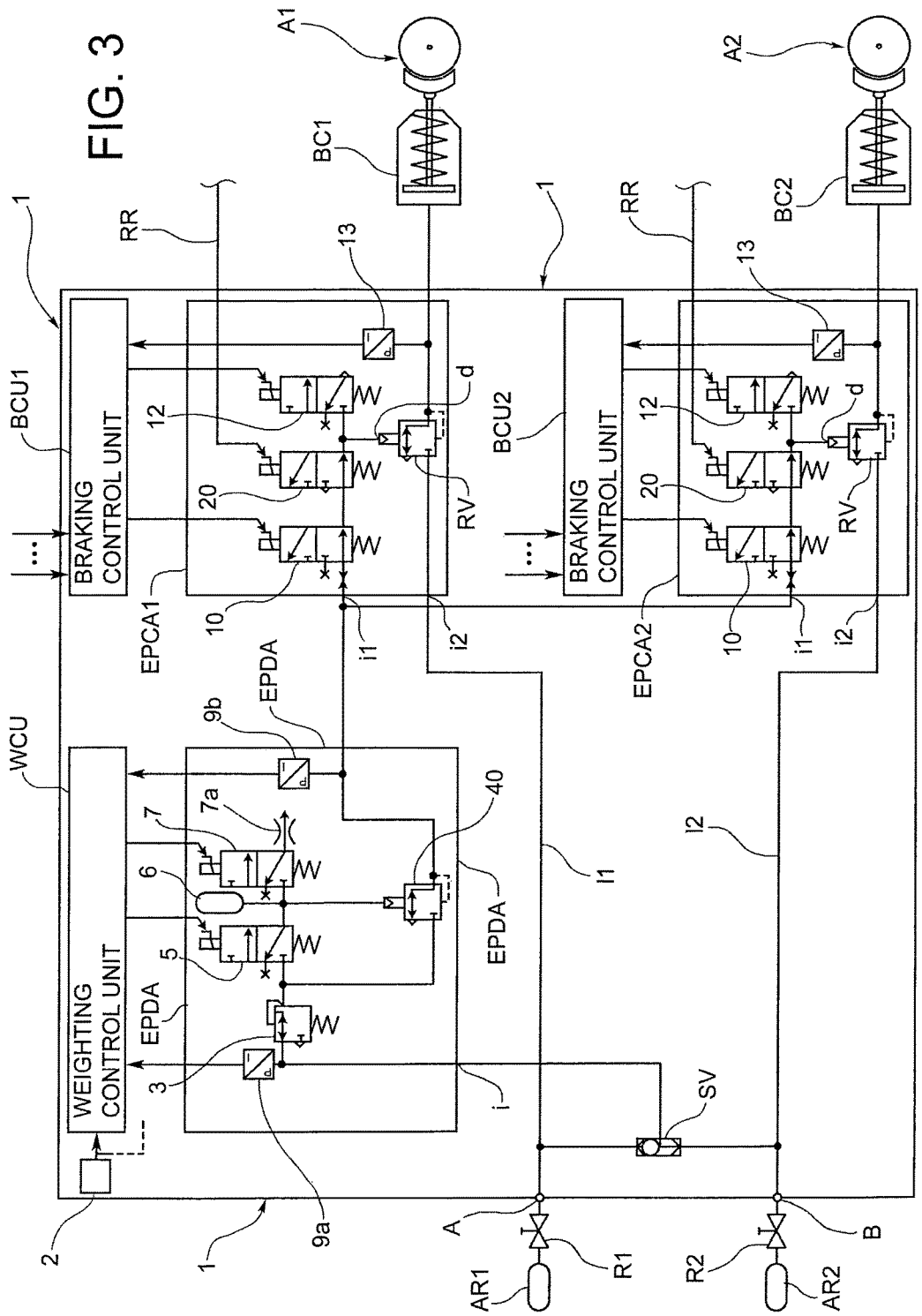

ELECTRO-PNEUMATIC APPARATUS FOR CONTROLLING THE BRAKING OF A RAILWAY VEHICLE

CROSS-REFERENCE TO RELATED APPLICATIONS

This application is the U.S. National Stage Application of International Patent Application No. PCT/IB2016/054541, filed on Jul. 29, 2016, which claims priority to Italian Patent Application No. 102015000041004, filed on Jul. 31, 2015, the contents of each of which is incorporated herein by reference in its entirety.

BACKGROUND

The present invention relates to an electro-pneumatic apparatus for controlling the braking of a railway vehicle.

More specifically, the invention concerns an electro-pneumatic apparatus comprising
means for generating a vehicle load signal,
weighting means designed to supply a weighted pneumatic pressure as a function of the load signal, and
first and second braking control means, both coupled to the weighting means and comprising respective relay valves which supply at their outlets respective braking pressures, modulated as a function of said weighted pneumatic pressure, to respective braking actuators associated with the wheels of a respective axle or of a respective bogie of the vehicle.

SUMMARY

An electro-pneumatic apparatus substantially of this type is described in the prior Italian patent application no. 102014902265250 in the name of the present applicant.

In the solution according to this prior patent application, the braking control means associated with the braking actuators receive a pneumatic pressure from the same main brake pipe.

With this solution, if there is a fault which prevents an axle (or a bogie) from being braked, the main brake pipe has to be uncoupled from the control means associated with both axles (or both bogies), until the problem has been resolved. Until that time, there is no way of braking the other axle of the same bogie (or the other bogie of the same vehicle).

One object of the present invention is to provide an electro-pneumatic control apparatus which enables the aforementioned drawbacks of the prior art solution to be overcome.

This and other objects are achieved according to the invention with an electro-pneumatic apparatus for controlling the braking of a railway vehicle, the salient characteristics of which are defined in the attached Claim 1.

Since, in this electro-pneumatic apparatus, the pneumatic pressure supply means comprise two independent pressure reservoirs, coupled via respective shut-off valves to the inlets of the relay valves of the first and second braking control means, respectively, associated with the braking actuators of the two axles (or the two bogies), in case of a breakdown or fault making it impossible to brake an axle of the bogie (or a bogie of the vehicle) it is possible, by closing the shut-off valve for the axle (or bogie) concerned, to maintain the braking functionality of the other axle of the bogie (or the other bogie of the vehicle).

In one embodiment, the aforesaid weighting means comprise an electro-pneumatic drive assembly comprising a solenoid charging valve and a solenoid discharge valve adapted to cause a pressure increase and a pressure reduction, respectively, in a pneumatic memory reservoir, the outlet of which is coupled to the first and second braking control means associated with the first and second axle of the bogie, or with the first and second bogie of the vehicle, and the inlet of which is coupled to the pneumatic supply means through a pressure limiting valve.

Conveniently, this pressure limiting valve is designed so that the pressure stored in said memory reservoir is always greater than 50% of the braking pressure specified for a crush load condition.

More preferably, said pressure limiting valve is designed so that the pressure stored in said memory reservoir is always at least equal to the braking pressure corresponding to the tare braking pressure of the vehicle.

BRIEF DESCRIPTION OF THE DRAWINGS

Further characteristics and advantages of the present invention will be apparent from the following detailed description, provided purely by way of non-limiting example, with reference to the attached drawings, in which FIGS. 1 to 3 show various layouts of apparatus according to the present invention.

DETAILED DESCRIPTION

Figure 1:
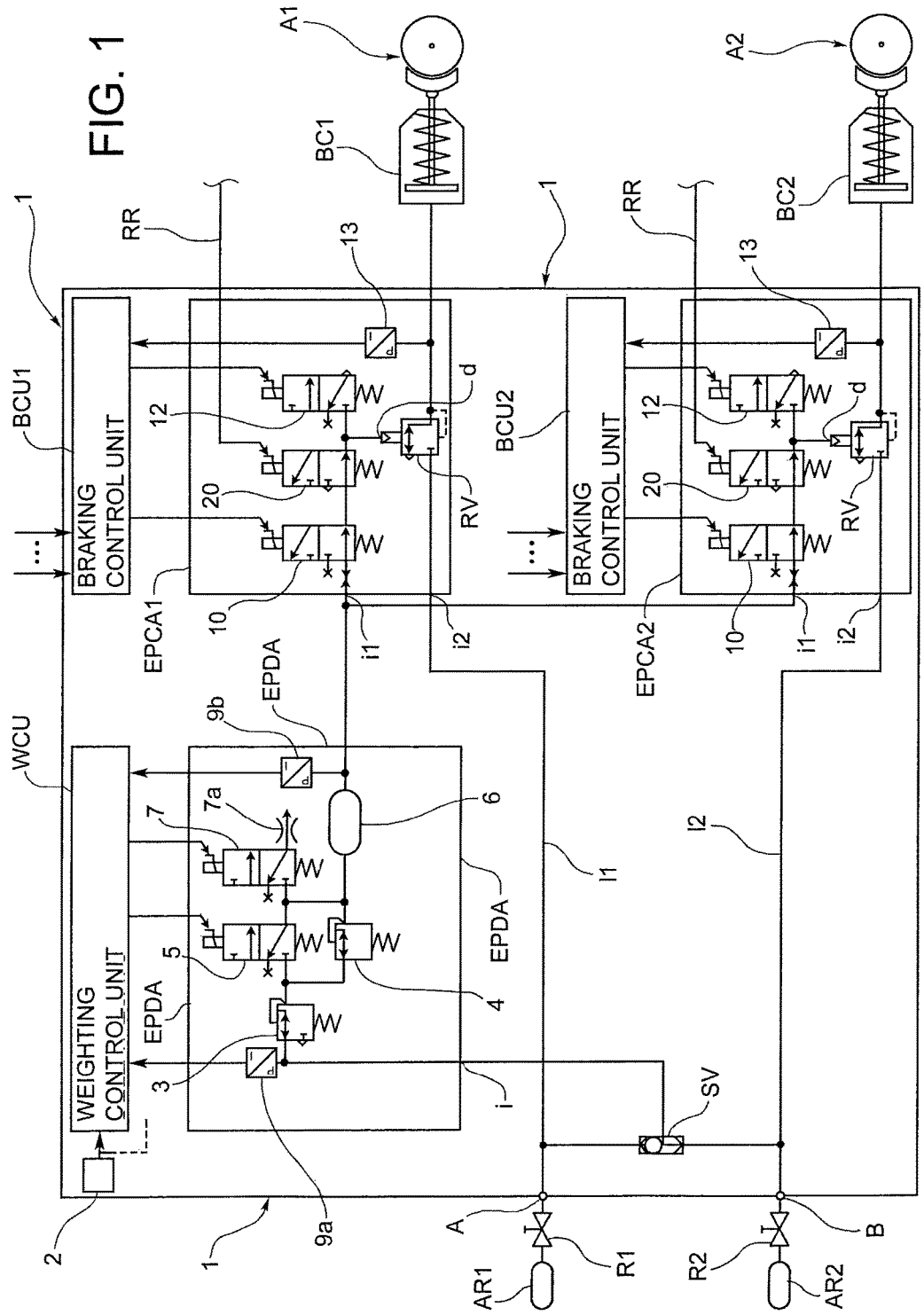

In FIG. 1, the number 1 indicates the whole of an apparatus for controlling the braking (axle by axle) of the axles A1 and A2 of a bogie of a railway vehicle of a known type.

However, the same apparatus 1 is suitable, mutatis mutandis, for providing similar control of the braking (bogie by bogie) of the bogies of the same railway vehicle.

The axles A1 and A2 are associated with respective brake cylinders BC1 and BC2.

These brake cylinders BC1, BC2 are associated with respective electro-pneumatic control assemblies EPCA1, EPCA2, preferably having the same architecture.

These electro-pneumatic assemblies EPCA1 and EPCA2 are controlled, in the illustrated embodiment, by respective electronic braking control units BCU1, BCU2, which could also be incorporated into a single electronic unit.

Said electro-pneumatic assemblies EPCA1, EPCA2 have respective first pneumatic inlets i1, both connected to the outlet of the same electro-pneumatic drive assembly EPDA, controlled in its operation by an electronic weighting control unit WCU.

The electro-pneumatic control assemblies EPCA1 and EPCA2 also have respective second pneumatic inlets i2 connected via respective lines l1 and l2 to a first and a second inlet connection A and B of the apparatus 1.

The connections A and B of the apparatus 1 are coupled via respective shut-off valves or cocks R1 and R2 to corresponding auxiliary pneumatic reservoirs AR1 and AR2.

The number 2 in the drawing indicates a device for generating signals indicative of the load or weight of the vehicle (or of a part thereof, such as the part bearing on the bogie), connected to the electronic unit WCU and (in a way which is not shown) to the control unit or units BCU1, BCU2 associated with the electro-pneumatic control assemblies EPCA1 and EPCA2.

The electronic units WCU and BCU1, BCU2 may be made in the form of free-standing electronic units, or may if necessary be integrated with one another in a single electronic control unit.

The electro-pneumatic control assemblies EPCA1 and EPCA2 each comprise a respective relay valve RV, connected between the inlet i2 and the associated brake cylinder BC1, BC2.

The relay valves RV are "power" valves.

As mentioned above, the inlets i2 of the control assemblies EPCA1 and EPCA2 are connected via lines or pipes 11 and 12, respectively, to the reservoirs AR1 and AR2, via the shut-off valves R1 and R2. The outlets of these valves R1 and R2 are coupled to a maximum pressure selector valve SV, the outlet of which is coupled to the inlet i of the electro-pneumatic drive assembly EPDA.

The selector valve SV may be, in practice, a double-seat check valve.

As will be evident from the following description, the weighting control unit WCU is designed to drive the assembly EPDA in such a way that a pneumatic pressure is supplied to the inlets i1 of the EPCA1 and EPCA2 during operation, this pressure being a "weighted" pneumatic pressure defining the maximum braking pressure, limited as a function of the load signal supplied by the sensor 2, and applicable to the brake cylinders BC1 and BC2.

On the other hand, the unit or units BCU1 and BCU2 are designed to drive the associated control assemblies EPCA1 and EPCA2 so as to cause the application to the associated brake cylinders BC1 and BC2 of a braking pressure which is equal to or lower than the aforesaid weighted pressure and is generally variable as a function of the level of the service braking request or the emergency braking request, which are received at the units BCU1, BCU2 in a known way.

The unit or units BCU1, BCU2 are also conveniently designed to drive the relay valves RV so as to provide an anti-wheel-slip action when wheel rotation speed signals enable a locked condition to be detected.

In greater detail, the electro-pneumatic drive assembly EPDA comprises pneumatic pressure regulating valve 3, the outlet of which is connected to the inlet of a solenoid charging valve 5 driven in operation by the weighting control unit WCU.

The solenoid charging valve 5 has its outlet connected to the inlet of a pressure reservoir 6, and to the inlet of a solenoid discharge valve 7 which, in operation, is also driven by the weighting control unit WCU.

In the illustrated embodiment, the solenoid valves 5 and 7 are three-way two-position valves which are normally closed.

The number 4 in FIG. 1 indicates a pressure regulating valve, connected between the regulating valve 3 and the reservoir 6, essentially in parallel with the solenoid charging valve 5.

The electro-pneumatic drive assembly EPDA also comprises two electric pressure sensors or transducers 9a and 9b, for detecting the pressure at the inlet of the regulating valve 3 and at the outlet of the reservoir 6, respectively. Both of these sensors are connected to the weighting control unit WCU.

Finally, the outlet of the solenoid discharge valve 7 communicates with the atmosphere via an associated calibrated throttle orifice 7a.

Each of the electro-pneumatic braking control assemblies EPCA1 and EPCA2 comprises a solenoid inlet valve 10, which is a solenoid charging or filling valve. This solenoid valve, in the illustrated embodiment, is of the three-way, two-position, normally open type, and has its outlet connected to the inlet of a further solenoid valve 20, the outlet of which is connected to the drive inlet d of the relay valve RV.

The solenoid valve 20 is also of the three-way, two-position, normally open type.

The outlet of the solenoid valve 20 is connected to the inlet of a solenoid discharge or evacuation valve 12, of the three-way, two-position, normally closed type.

The solenoid valve 20 is intended to cause, when energized, the release of the braking by the associated cylinder BC1 or BC2.

A pressure sensor or transducer 13 is connected pneumatically between the outlet of the relay valve RV and that of the associated brake cylinder BC1 or BC2, in order to supply, in operation, an electrical signal indicative of the pressure at the outlet of said relay valve RV.

The apparatus described above for controlling the braking of the axles A1 and A2 of a bogie of a railway vehicle operates essentially in the following manner.

The electronic weighting control unit WCU receives from the device 2 a signal indicative of the weight of the railway vehicle or of a part thereof bearing on the controlled bogie.

The weighting control unit WCU drives the solenoid valves 5 and 7 of the electro-pneumatic assembly EPDA in such a way that, when these solenoid valves are de-energized, the first valve 5 disconnects the reservoir 6 from the outlet of the pressure regulator 3, and the second valve 7 prevents the reservoir 6 from discharging into the atmosphere.

When the solenoid charging valve 5 is energized, it couples the reservoir 6 to the outlet of the valve SV, and therefore to the pressure supply, via the pressure regulating valve 3.

When the solenoid discharge valve 7 is energized, it allows the pressure previously accumulated in the reservoir 6 to be discharged into the atmosphere, although at a slower rate, due to the presence of the calibrated orifice 7a.

The pressure sensor or transducer 9b supplies an electrical signal indicative of the pressure instantaneously present at the outlet of the reservoir 6 to the electronic weighting control unit WCU.

By driving the solenoid valves 5 and 7, the control unit WCU acts in such a way that a weighted pneumatic pressure is present at the outlet of the reservoir 6, this pressure defining the maximum value of the braking pressure applicable to the brake cylinders BC1 and BC2.

The inlet pressure regulating device 3 prevents the pressure at the inlet of the solenoid valve 5 from exceeding a predetermined maximum value.

The pressure limiting valve 4 is designed so that the pressure stored in the reservoir 6 is always greater than 50% of the braking pressure specified for a crush load condition.

This at least enables the braking force on an axle to be preserved if the other axle of the same bogie becomes impossible to brake due to a fault of any kind.

Conveniently, the pressure limiting valve 4 is designed so that the pressure stored in the reservoir 6 is always at least equal to the braking pressure corresponding to the tare braking pressure of the vehicle.

In the case of railway vehicles for passenger transport, the tare braking pressure of the vehicle is always greater than 50% of the total weight.

Since the electro-pneumatic apparatus 1 is designed so that, in any circumstances, the brake cylinder of each axle A1, A2 is supplied with at least a pressure equal to the tare braking pressure (the braking pressure capable of braking the empty vehicle (tare weight only) within a specified stopping distance), the bogie, when braked at the tare braking pressure, is braked (at least) as a bogie in which one axle is braked at the correct pressure, corresponding to the instantaneous load, and the other axle is not braked.

The vehicle can therefore comply with the emergency stopping distances, even if the bogie is braked at the tare braking pressure rather than the correct value.

During the normal running of the railway vehicle, the control unit or units BCU1, BCU2 control the value of the pressure at the outlet of the relay valves RV in such a way that this pressure is proportional to the weighted drive pressure sent to their inlets d by the electro-pneumatic drive assembly EPDA, and proportional to the service braking request applied to this unit or these units BCU1, BCU2.

When a unit or units BCU1, BCU2, on the basis of signals indicative of the rotation speed of the wheels of the vehicle, detect a wheel slip condition, this causes a reduction of the braking pressure at the associated brake cylinder, by energizing the corresponding solenoid charging valve 10 and de-energizing the solenoid discharge valve 12, until the slip condition is resolved.

The solenoid valve 20 of each assembly EPCA1, EPCA2 can be energized by means of a remote braking release control signal (remote release signal) RR.

The positioning of the solenoid valves 20, which enable the brake release to be controlled, between the associated solenoid valves 10 and valve 12 is such that they do not affect the speed of the air flow between the drive chamber of the relay valves RV and the solenoid discharge valves 12.

This positioning of the solenoid valves 20 prevents the emptying of the drive chamber of the associated relay valves RV from being slowed down in the course of anti-wheel-slip braking.

In operation, the weighting control unit WCU provides continuous regulation of the pneumatic pressure in the reservoir 6 when pressure variations are present in the drive chambers of the relay valves RV of the electro-pneumatic control assemblies EPCA1, EPCA2, both in service braking and in emergency anti-wheel-slip braking.

Conveniently, the volume of the reservoir 6 is at least ten times the sum of the volumes of the drive chambers of the relay valves RV, in order to provide "soft" control.

The pressure in the reservoir 6 may be controlled on the basis of a predetermined algorithm, for example the algorithm described in the prior Italian patent application mentioned above.

In the apparatus according to the present invention, the pressure limiting valve 4 plays a rather important part: even if there is a fault in the weighting control unit WCU and/or in the solenoid valves 5 and 7, it ensures that the brake cylinders BC1 and BC2 are actuated with a braking pressure at least equal to the tare pressure which, in the case of a passenger transport vehicle, is always greater than the braking pressure of an axle in the worst load condition (crush load).

The calibrated orifice 7a serves to limit the pressure loss from the reservoir 6 if the solenoid discharge valve 7 becomes jammed in the condition in which this reservoir is put into communication with the atmosphere.

If there is a fault in the part of the apparatus 1 relating to an axle A1 or A2, the corresponding auxiliary reservoir AR1 or AR2 can be disconnected by means of the corresponding shut-off valve R1 or R2. However, the braking on the other axle A2 or A1 continues to be operative.

Figure 2:
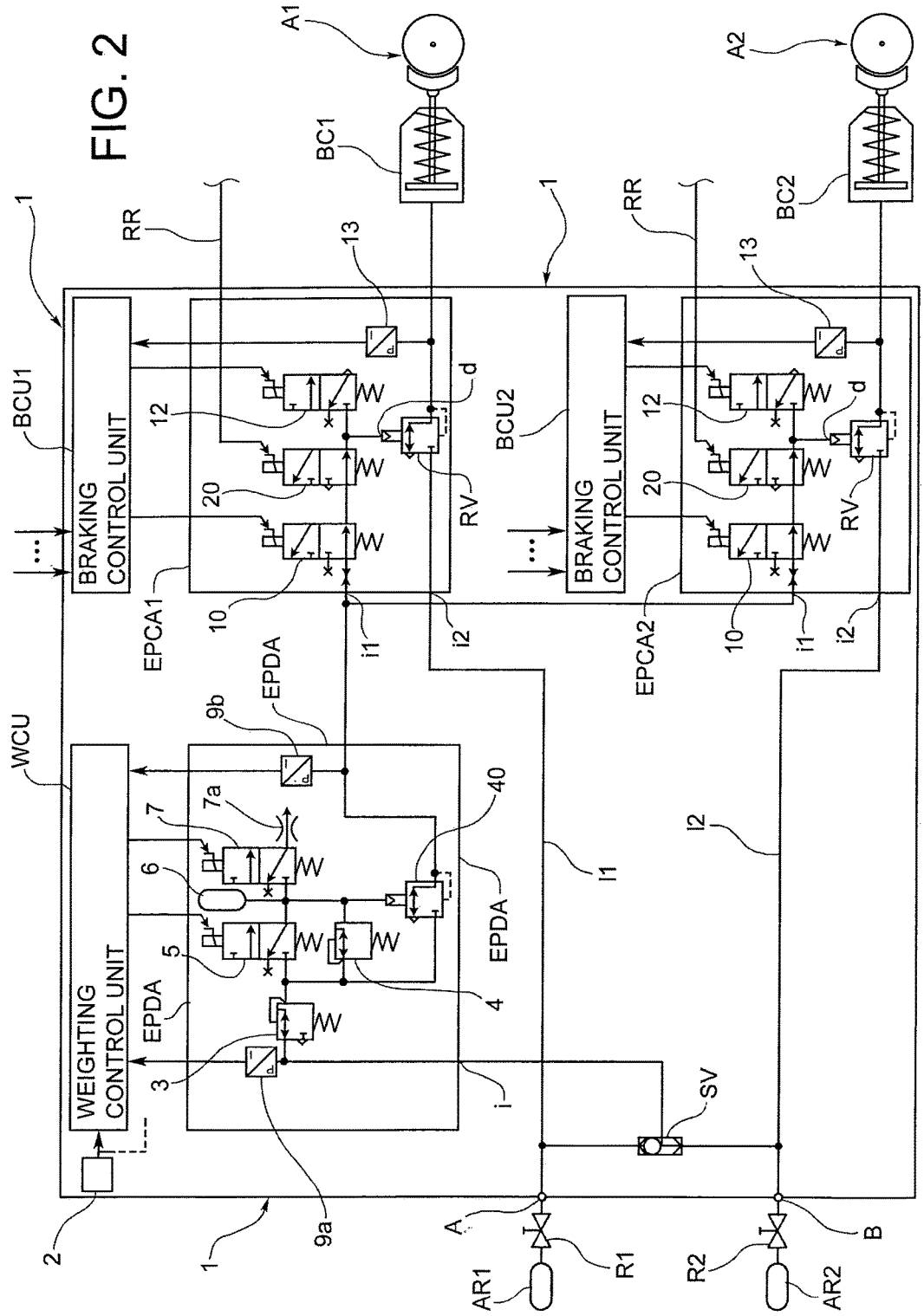

FIGS. 2 and 3 show two variant embodiments. In these figures, parts and elements described previously have been given the same alphanumeric symbols as those used previously. The two variants differ from the apparatus of FIG. 1 solely as regards the architecture of the electro-pneumatic drive assembly EPDA.

In the variant according to FIG. 2, the drive assembly EPDA comprises a solenoid relay valve 40 having its (power) inlet connected to the valve SV via the pressure regulating valve 3 and its outlet connected to the inlets i1 of the electro-pneumatic control assemblies EPCA1 and EPCA2. The relay valve 40 has its drive inlet connected to the outlet of the solenoid charging valve 5. Additionally, the pneumatic memory reservoir 6 is connected (solely) to the outlet of said charging valve 5.

The pressure limiting valve 4 is made and operates as described above with reference to FIG. 1.

The mode of operation of the variant according to FIG. 2 is similar to that of the apparatus according to FIG. 1.

The variant according to FIG. 3 is generally similar to that according to FIG. 2, from which it differs essentially in that the relay valve 40 of the electro-pneumatic drive assembly EPDA is designed so that it also operates as a pressure limiting valve.

Clearly, provided that the principle of the invention is retained, the forms of application and the details of embodiment can be varied widely from what has been described and illustrated purely by way of non-limiting example, without thereby departing from the scope of protection of the invention as defined by the attached claims.

The invention claimed is:

1. Electro-pneumatic apparatus for controlling the braking of a bogie of a railway vehicle, comprising
   means for generating a vehicle load signal,
   weighting means designed to supply a weighted pneumatic pressure as a function of the load signal, and
   first and second braking control means both coupled to the weighting means and comprising respective relay valves which supply at their outlets respective braking pressures, modulated as a function of said weighted pneumatic pressure, to respective braking actuators associated with the wheels of a respective axle or of a respective bogie of the vehicle;
   the weighting means comprising an electro-pneumatic drive assembly which is interposed between pneumatic pressure supply means and the drive inlet of the relay valves and an electronic weighting control unit which controls said drive assembly as a function of said load signal, so as to modulate in a predetermined way the pressure at the drive inlet of said relay valves; and
   wherein said pneumatic pressure supply means comprise first and second pressure reservoirs coupled to the inlet of the relay valve of the first and second braking control means, respectively, through respective shut-off valves.

2. Electro-pneumatic apparatus according to claim 1, wherein the outlets of said shut-off valves are coupled to a maximum pressure selector valve, the outlet of which is coupled to the inlet of said electro-pneumatic drive assembly.

3. Electro-pneumatic apparatus according to claim 1, wherein said electro-pneumatic drive assembly comprises a solenoid charging valve and a solenoid discharge valve adapted to cause a pressure increase and a pressure reduction, respectively, in a memory reservoir, the outlet of which is coupled to the first and second braking control means and the inlet of which is coupled to said pneumatic pressure supply means through a pressure limiting valve.

4. Electro-pneumatic apparatus according to claim 3, wherein said pressure limiting valve is designed so that the pressure stored in said memory reservoir is always greater than 50% of the braking pressure specified for a crush load condition.

5. Apparatus according to claim 3, for a railway vehicle for passenger transport, wherein said pressure limiting valve is designed so that the pressure stored in said memory reservoir is always at least equal to the braking pressure corresponding to the tare braking pressure of the vehicle.

6. Apparatus according to claim 4, wherein the outlet of the solenoid discharge valve of the electro-pneumatic drive assembly is coupled to a calibrated orifice, adapted to impede the evacuation of the memory reservoir if said solenoid discharge valve is jammed in the condition in which the pressure is discharged to the atmosphere.

* * * * *